No. 606,875. Patented July 5, 1898.
J. McDONOUGH.
HORESHOE AND REMOVABLE CALK THEREFOR.
(Application filed Oct. 20, 1897.)
(No Model.) 2 Sheets—Sheet 2.
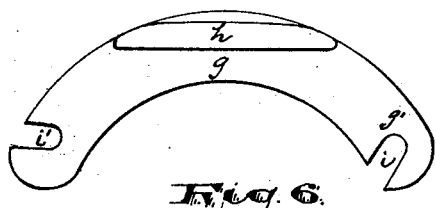
Fig. 6.
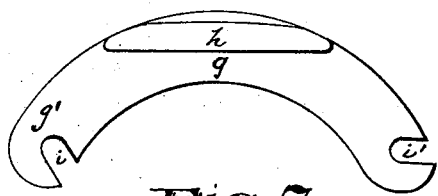
Fig. 7.
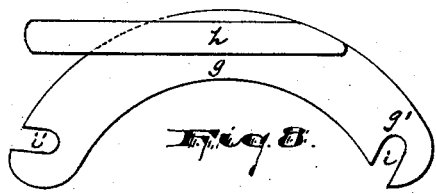
Fig. 8.
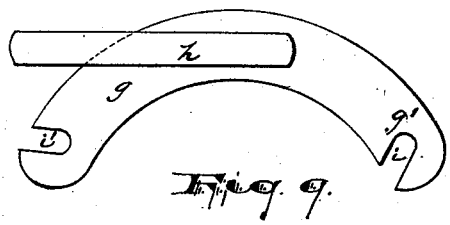
Fig. 9.
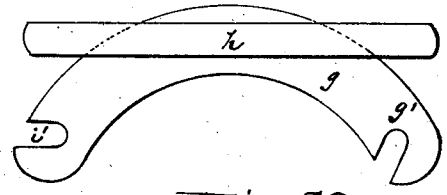
Fig. 10.
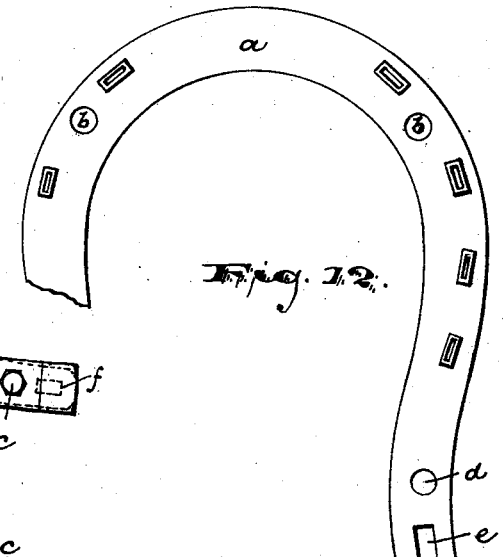
WITNESSES:
A. R. Krausse
C. B. Pitney
INVENTOR:
James McDonough,
BY Drake & Co.
ATTORNEYS.

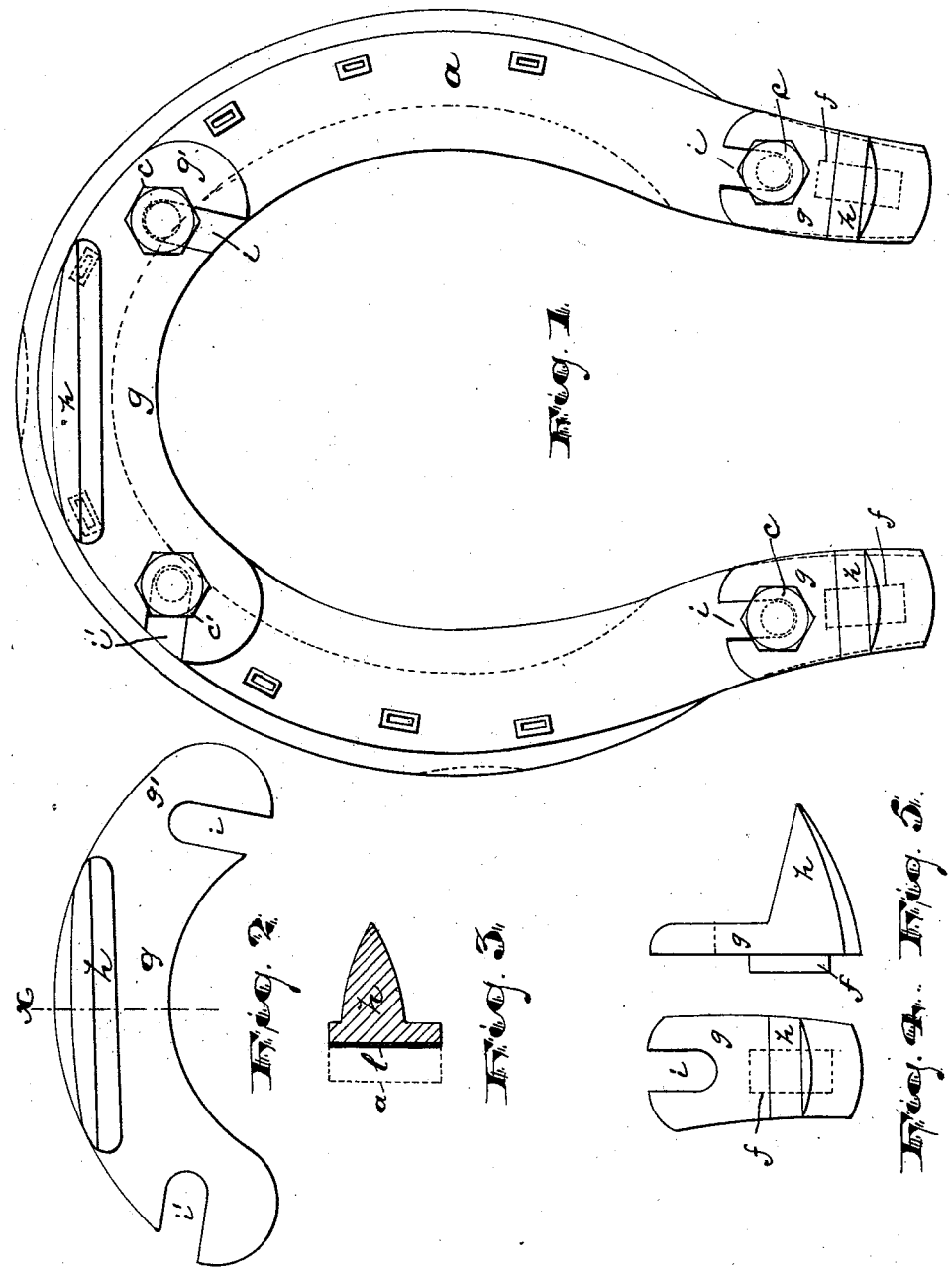

UNITED STATES PATENT OFFICE.

JAMES McDONOUGH, OF MONTCLAIR, NEW JERSEY.

HORSESHOE AND REMOVABLE CALK THEREFOR.

SPECIFICATION forming part of Letters Patent No. 606,875, dated July 5, 1898.

Application filed October 20, 1897. Serial No. 655,808. (No model.)

*To all whom it may concern:*

Be it known that I, JAMES McDONOUGH, a citizen of the United States, residing at Montclair, in the county of Essex and State of New Jersey, have invented certain new and useful Improvements in Horseshoes and Removable Calks Therefor; and I do hereby declare the following to be a full, clear, and exact description of the invention, such as will enable others skilled in the art to which it appertains to make and use the same, reference being had to the accompanying drawings, and to letters of reference marked thereon, which form a part of this specification.
The objects of this invention are to provide removable calks for horseshoes which will permit of being arranged upon the body of the shoe with greater facility and ease, to secure a strong fastening for the calks, whereby they will not be broken or otherwise displaced in their relation to the said body of the shoe, to enable the calk to be applied to shoes of various sizes without changing the construction of the calk and to enable a given calk to be applied to a given shoe even after the latter has been changed in shape and made to fit the peculiar shape of an animal, and to secure other advantages and results, some of which may be referred to hereinafter in connection with the description of the working parts.

The invention consists in the improved shoe for horses, mules, and other equine animals and in the arrangements and combinations of parts of the same, all substantially as will be hereinafter set forth and finally embraced in the clauses of the claim.

Referring to the accompanying drawings, in which like letters of reference indicate corresponding parts in each of the several views, Figure 1 is a plan of a horseshoe having my improved calks. Fig. 2 is a detail plan of a toe-calk of the preferred construction. Fig. 3 is a section of the same, taken on line *x*. Figs. 4 and 5 are respectively a plan and a side elevation of one of the heel-calks. Figs. 6 and 7 are plans showing the relation between the right and left toe-calks with reference to location and showing the arrangement by which the inside or the contiguous ends of the toe-calks have such a relation to the respective shoes as that there will be no inside projection of the toe-calks beyond the inner side of the shoe, such as would tend to injure the animal should a large size of toe-calk be employed, temporarily or otherwise, as a matter of convenience. Figs. 8 and 9 are similar plan views of the toe-calks of modified construction, showing the downward projection of the calk extended laterally to adapt the calk to certain peculiar conditions well known in the horseshoeing art. Fig. 10 shows the downward projection extending out laterally in opposite directions. Fig. 11 shows modified constructions of both toe and heel calks and particularly showing one of the heel-calks extending laterally from the shoe. Fig. 12 is a plan of a portion of the under side of a shoe, the calks being removed to show holes or apertures to receive the retaining-screws.

In said drawings, *a* indicates the body of a shoe for horses, &c. At the toe or fore part of the said body are formed screw-threaded holes *b b*, adapted to receive the screws *c*, by means of which the toe-calks are clamped firmly in position upon said toe or fore part.

At the heel extensions of the shoe said extensions are each provided with holes *d* and *e*, Fig. 12, the holes *d d* being threaded to receive the retaining-screws of the heel-calks and the holes *e e* being adapted to receive lugs *f* of the heel-calks, the said lugs being preferably made square or angular and the holes therefor being preferably of like shape, the angular holes when employed being intended to prevent pivotal action of the heel-calk more certainly and effectually and relieve the fastening-screws of said heel-calks from any pivotal action or lateral strain.

It will be observed that the toe portion of the horseshoe-body is provided with a pair of retaining-screws *c c'*, the individual members of the pair being disposed at about equal distances from the front and rear center line of the shoe on opposite sides thereof, one of said screws *c* serving as a pivot upon which the toe-talk may be turned in making the adjustment and both of said screws serving as clamps for holding the calk firmly upon the shoe-body.

The retaining-screw *c'* at the outer side of the shoe is intended to be employed as the pivot.

The heel and toe calks each consist of a horizontal plate or flange $g$ and a downward projection $h$, adapted to be sharpened or otherwise formed to engage the ground, as may be desired, in any ordinary manner.

The flange $g$ of the toe-calk is provided with open slots $i\ i'$, the slot $i$ at the inside end of the calk opening toward the inner or concave edge of the calk and the outer opening $i'$ extending out through the convex side of the flange. By this construction I am enabled to remove the calk by simply loosening the clamping-screws $c$ and turning the calk upon the screw, which serves as a pivot at the outer end of the calk, the free end $g'$ in that event passing out from the second clamping-screw through the slot $i$, which is more or less segmentally arranged concentric with a circle of which the slot $i$ is the center.

In arranging the calk in place the reverse action is performed, the calk end having the slot $i'$ opening at the convexity being thrust upon the shank of the screw on the outer side of the shoe between the head of said screw and the body of the shoe and then turning the said calk pivotally to bring the second screw into the segmental opposite slot $i$. The screws are then screwed up and the heads thereof firmly and securely clamp the flange $g$ against the under side of the curved toe portion of the shoe. The heel parts are each provided with but a single clamping-screw $c$, and to prevent the calks from turning pivotally upon said screw I have provided said calks with the lug $f$, which is preferably of angular shape and fits in a correspondingly angular hole or recess $e$ in the end of the shoe, as above described.

In adjusting or applying the heel-calks I first insert the open slotted flange of the calk beneath the loosening head of the retaining-screw $c$ and bring the lug $f$ into coincidence with the hole or recess $e$ beneath the shoe. I then, after inserting said lug in said recess, screw up the clamping or retaining screw, and thus firmly and securely hold said heel-calks in position. In removing said heel-calks it is unnecessary to entirely remove the retaining-screws. I simply loosen said screws sufficiently to allow the lugs to be withdrawn from the recess.

I prefer to insert between the top of the calk and the shoe a cushion $l$, Fig. 3, of more or less elastic material—such as sheet-asbestos, indurated fiber, or the like—to serve, because of the slight resiliency inhering therein, to hold the screws against turning under the jarring action incident to travel.

I have shown various ways of forming the downward projections of the calk simply to indicate that my invention may be applied to various styles of shoes, and I do not wish, therefore, to be limited to the exact arrangements and combinations of parts illustrated, excepting as the state of the art may require.

Having thus described the invention, what I claim as new is—

1. The combination with the shoe-body, of a calk comprising a downward projection and a flange, the flange being provided with an open slot adapted to permit of the calk being withdrawn in a direction parallel with the plane of the body of the shoe, substantially as set forth.

2. The combination with the horseshoe, of a calk having a downward projection to engage the ground and a flange to engage the under side of the shoe, the said flange being provided with an open slot to receive a retaining-screw and adapted to permit the withdrawal of the said flange without entirely removing the said retaining-screw and coöperating means adapted to prevent pivotal action of the calk on said retaining-screw, substantially as set forth.

3. The combination with the horseshoe, having threaded holes at the toe portion, at points at opposite sides of the center line and retaining-screws arranged in said holes of a toe-calk comprising a curved piece of metal corresponding in shape with the fore part of the shoe and having a downward projection to engage the ground, and a flange, said flange being provided near its opposite ends with open slots one of which opens outwardly toward the convexity of the calk and the other opening inwardly toward the concavity of the said calk, whereby the said toe-calk may be adjusted to shoes of various shapes, substantially as set forth.

In testimony that I claim the foregoing I have hereunto set my hand this 15th day of October, 1897.

JAMES McDONOUGH.

Witnesses:
CHARLES H. PELL,
C. B. PITNEY.